(12) United States Patent
Kaneko

(10) Patent No.: US 8,376,671 B2
(45) Date of Patent: Feb. 19, 2013

(54) TOOL HOLDER

(75) Inventor: Hiroo Kaneko, Kanagawa (JP)

(73) Assignee: Makino Milling Machine Co., Ltd, Tokyo (JP)

( * ) Notice: Subject to any disclaimer, the term of this patent is extended or adjusted under 35 U.S.C. 154(b) by 573 days.

(21) Appl. No.: 12/667,779

(22) PCT Filed: Aug. 6, 2007

(86) PCT No.: PCT/JP2007/065791
§ 371 (c)(1),
(2), (4) Date: Jan. 5, 2010

(87) PCT Pub. No.: WO2009/019794
PCT Pub. Date: Feb. 12, 2009

(65) Prior Publication Data
US 2010/0171276 A1 Jul. 8, 2010

(51) Int. Cl.
*B23C 5/26* (2006.01)
*B23C 9/00* (2006.01)
(52) U.S. Cl. ........ 409/233; 409/232; 409/234; 340/4.36; 340/680; 279/126; 408/8; 408/16; 483/9
(58) Field of Classification Search ............... 483/9, 8, 483/10, 12, 7; 340/4.36, 680; 408/8, 16, 408/226, 239 R, 239 A; 279/126; 409/234, 409/232, 233; 407/120, 30
See application file for complete search history.

(56) References Cited

U.S. PATENT DOCUMENTS

| | | | |
|---|---|---|---|
| 3,704,510 A | 12/1972 | Sedgwick et al. | |
| 4,742,470 A | 5/1988 | Juengel | |
| 4,850,766 A * | 7/1989 | Furuhashi et al. | 409/234 |
| 6,585,628 B1 | 7/2003 | Tsung et al. | |
| 8,047,746 B2 * | 11/2011 | Olsson | 407/11 |
| 2006/0127197 A1* | 6/2006 | Storch et al. | 409/234 |

FOREIGN PATENT DOCUMENTS

| | | | |
|---|---|---|---|
| DE | 3607771 A | * | 9/1987 |
| JP | 5947134 | | 3/1984 |
| JP | 393051 | | 9/1991 |
| JP | 593733 | | 12/1993 |
| JP | 07-156036 | | 6/1995 |
| JP | 2001-233337 A | | 8/2001 |
| JP | 2002507937 | | 3/2002 |
| JP | 2002-144519 A | | 5/2002 |
| JP | 2005-215324 A | | 8/2005 |
| JP | 2006-026865 A | | 2/2006 |
| WO | WO-2007/106025 A1 | * | 9/2007 |

OTHER PUBLICATIONS

Machine translation of DE 3607771, which DE '771 was published Sep. 1987.*

* cited by examiner

*Primary Examiner* — Erica E Cadugan
(74) *Attorney, Agent, or Firm* — Paul & Paul

(57) ABSTRACT

An ID tag (27) is attached to a bottom surface (31) of a hollow portion (17) of a tool holder (11) having a hollow taper shank. Concretely, a circular recess (33) is formed on bottom surface (31) of hollow portion (17), and ID tag (27) is attached in recess (33) by means of adhesive or the like. The center of circular recess (33) coincides with a rotation axis of tool holder (11).

1 Claim, 1 Drawing Sheet

TOOL HOLDER

TECHNICAL FIELD

The present invention relates to a tool holder equipped with a main spindle of a machine tool, and in particular, relates to a tool holder having an ID tag, by which reading or writing information regarding the tool holder and/or a tool held by the holder is possible.

BACKGROUND ART

As a tool holder having a hollow taper shank equipped with a main spindle of a machine tool, a tool holder having a shank specified in Deutsche Industrie Normen (DIN) 69893 (HSK shank), and a tool holder having a shank developed by Kennametal Inc. (KM shank) are known.

Various kinds of means, which identify the type or model number of a tool equipped with a spindle of a machine tool, have been proposed. For example, FIG. 2 of U.S. Pat. No. 3,704,510 discloses a tool holder having a coded collar. In this case, a binary code is read by using a switch mechanism based on a combination of a groove and a ring formed in the collar.

Japanese Unexamined Patent Publication (Kokai) No. 59-47134 discloses a tool holder having an identification mark formed by etching. The identification mark of the tool holder is read by a portable reader.

In addition to reading data of a tool, a means capable of writing data regarding used hours or an amount of offset of the tool has been used, in view of management of the dimension or life of the tool. For example, FIGS. 7 and 8 of U.S. Pat. No. 4,742,470 disclose a tool adapter (or a tool holder) having a transponder attached to a drive key slot. In this case, a transceiver having a read/write head is fixed to a machine tool, and information stored in a memory of the transponder is read or new information is saved in the memory.

Further, Japanese Unexamined Utility Model Publication (Kokai) No. 5-93733 discloses a tool holder having an ID tag attached to a pull stud. The ID tag is positioned in a recess formed at a head of the pull stud of the tool holder.

In the tool holder having the coded collar as disclosed in U.S. Pat. No. 3,704,510, or the tool holder having the identification mark formed by etching as disclosed in Japanese Unexamined Patent Publication (Kokai) No. 59-47134, it may be difficult to correctly read data when a chip or machining fluid becomes adhered to the collar or the mark.

In the tool holder having the drive key slot as disclosed in U.S. Pat. No. 4,742,470, the ID tag may be relatively easily attached by inserting the ID tag in the key slot. However, since the ID tag is exposed outside, a chip or machining fluid may become adhered to the ID tag, resulting in it being difficult to correctly read/write. Further, since the ID tag is attached to the outside of the tool holder, the rotational balance of the tool holder may be deteriorated.

In the tool holder having the ID tag attached to the head of the pull stud as disclosed in Japanese Unexamined Utility Model Publication (Kokai) No. 5-93733, the ID tag is located at a rear end of the tool holder. Therefore, when an operator handles the tool holder, a chip may become adhered to the ID tag, or the operator may accidently damage the ID tag.

DISCLOSURE OF THE INVENTION

Thus, one object of the present invention is to provide a tool holder having a hollow taper shank, wherein a chip or machining fluid cannot become adhered to an ID tag and the ID tag is not likely to be damaged by external impact. The other object of the invention is to provided a tool holder wherein the rotational balance thereof cannot be deteriorated even when an ID tag is attached to the tool holder.

In order to achieve the above object according to the present invention, there is provided a tool holder having a hollow taper shank, wherein a hollow portion, having a bottom surface and opened at a rear end of the tool holder, is formed in the tool holder, and an ID tag, adapted to identify a tool and/or a tool holder, is attached to a central part of the bottom surface of the hollow portion.

In such a constitution, the ID tag is attached to the central part of the bottom surface (concretely, bottom surface 31 as described below with reference to FIG. 1) of the hollow portion. Therefore, a chip or machining fluid cannot become adhered to the ID tag, and the ID tag is unlikely to be damaged by external impact. Due to this, reading/writing of data of the tool may be stably carried out. Generally, in one type of a tool holder having a hollow taper shank, a drive key slot may be formed on the periphery of the tool holder, and the other type of a tool holder having no key slot for high rotational speed application. In any type, the ID tag is attached to the central part of the bottom surface of the hollow portion in the invention, the rotational balance of the tool holder cannot be deteriorated due to the attached ID tag.

According to the present invention, a recess is formed at the central part of the bottom surface of the hollow portion, and the ID tag is positioned in the recess. Therefore, a chip or machining fluid cannot become adhered to the ID tag, and the ID tag is unlikely to be damaged by external impact, whereby life of the ID tag may be extended.

BRIEF DESCRIPTION OF THE DRAWINGS

The above and other objects, features and advantages of the present invention will be made more apparent from the following description of the preferred embodiments thereof, with reference to the accompanying drawings, wherein.

BEST MODE FOR CARRYING OUT THE INVENTION

Preferred embodiments of the present invention will now be described with reference to the accompanying drawings.

Figure 1:
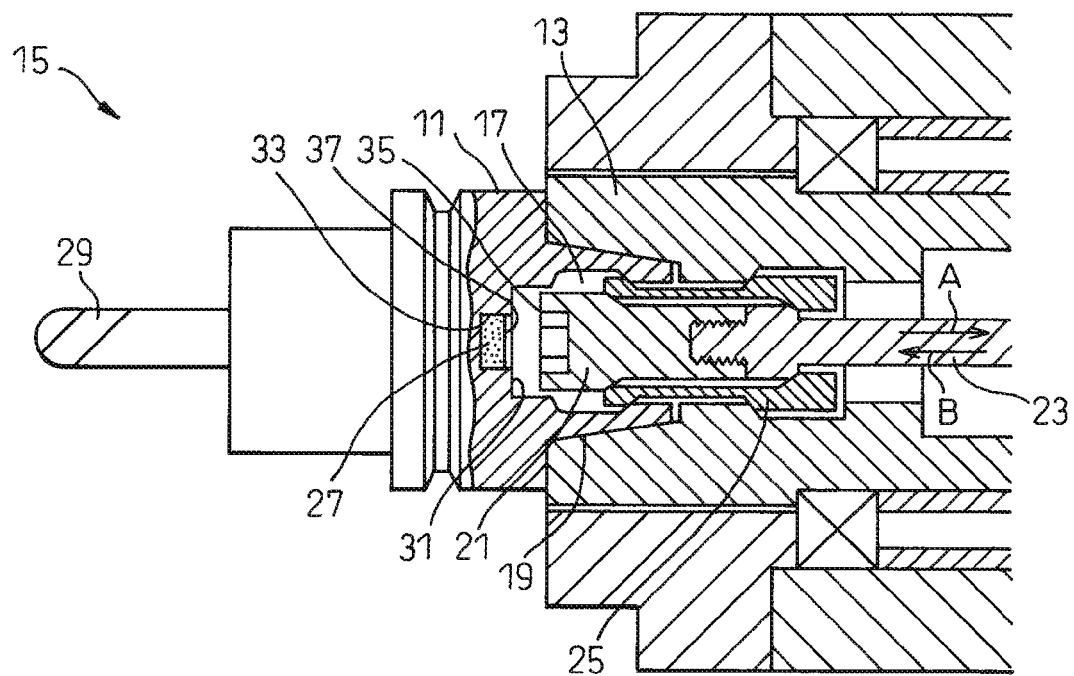
FIG. 1 is a partial cross-sectional view illustrating a front section of a spindle device provided with an HSK shank tool holder having an ID tag attached thereto, according to an embodiment of the present invention.

FIG. 1 shows a spindle device 15 of a machine tool, having a main spindle 13 and a tool holder 11 equipped with spindle 13. In the present invention, a side of tool holder 11, where a tool 29 is held, is referred to as a front side, and a side of tool holder 11, where a taper shank 19 is formed, is referred to as a rear end. In the embodiment, the invention is applied to a tool holder having an HSK shank. Tool holder has a taper shank 19 having a hole or hollow portion 17 which is opened in the rear direction. When tool holder 11 is attached to spindle 13, a drawbar 23, having a collet driver 21 attached to a front end thereof, is moved to the rear side of the spindle, as indicated by an arrow A. Then, a split collet 25, positioned in hole 17 of tool holder 11, is expanded so as to contact an inner surface of hole 17. Drawbar 23 is biased toward the rear side of the spindle by means of a disc spring (not shown). On the other hand, when tool holder 11 is detached from spindle 13, drawbar 23 is moved toward the front side of the spindle, as indicated by an arrow B, by means of an unclamp cylinder (not shown). Then, split collet 25 does not contact or press the inner surface of hole 17 of tool holder 11.

The tool holder of the invention is not limited to an HSK shank, as long as the tool holder has a hollow taper shank. For example, the tool holder may be a KM shank. A tool holder having a KM shank has a ball movable in the radial direction, instead of split collet 25, and a taper shank may be expanded or constricted by means of the ball, corresponding to the movement of the drawbar in the front-rear direction. Except for the above, the KM shank tool holder may have the same constitution as the HSK shank tool holder.

As shown in FIG. 1, tool holder 11 has an identification tag (ID tag) 27. ID tag 27 may be a commercialized ID tag having a generally cylindrical or ring shape, which is capable of storing tool data for identifying the tool and/or the tool holder. The tool data may include type, dimension, use conditions and used hours of tool 29 held by tool holder 11, and model number of tool holder 11. The tool data stored in ID tag 27 may be read or new data may be stored in ID tag 27, by means of a reader/writer 43. In the present invention, ID tag 27 is attached to a central part of a bottom surface 31 of hole 17. Concretely, a circular recess 33 is formed on bottom surface 31 of hole 17, and ID tag 27 is attached in recess 33 by means of adhesive or the like. The center of circular recess 33 coincides with a rotation axis of tool holder 11. Instead of the adhesive, a snap ring may be used to attach the ID tag to the recess. Further, when the ID tag has a ring shape, a screw may also be used.

Generally, in many cases, an ID tag is embedded in a peripheral part of a tool holder, such as a drive key slot, in order to facilitate attachment of the ID tag to the tool holder, and/or in order to allow a reader/writer, adapted to read or write data from or to the ID tag, to approach the ID tag. On the other hand, in the present invention, ID tag 27 is attached to the central part of tool holder 11, as described above. Therefore, the rotational balance of tool holder 11 cannot be deteriorated.

Since ID tag 27 is attached to bottom surface 31 of hollow portion 17 of tool holder 11, a chip or machining fluid cannot be attached or adhered to the ID tag, and the ID tag is unlikely to be affected by impact from the outside. Therefore, the ID tag is unlikely to be damaged or malfunction, whereby reading/writing of the ID tag may be stably carried out.

When tool holder 11 is detached from spindle 13, drawbar 23 is moved toward the front side of the spindle, as indicated by arrow B, and then a front end surface 35 of collet driver 21 contacts bottom surface 31 of tool holder 11. At this point, in order to prevent collet driver 21 from directly impacting on or colliding with ID tag 27, ID tag 27 is arranged so that ID tag 27 does not protrude from bottom surface 31 toward the rear side. Concretely, ID tag 27 is preferably arranged so that a surface 37 thereof, facing in the rear direction, is retracted toward the front direction relative to bottom surface 31 by approximately 0.1 mm to 0.5 mm.

Figure 2:
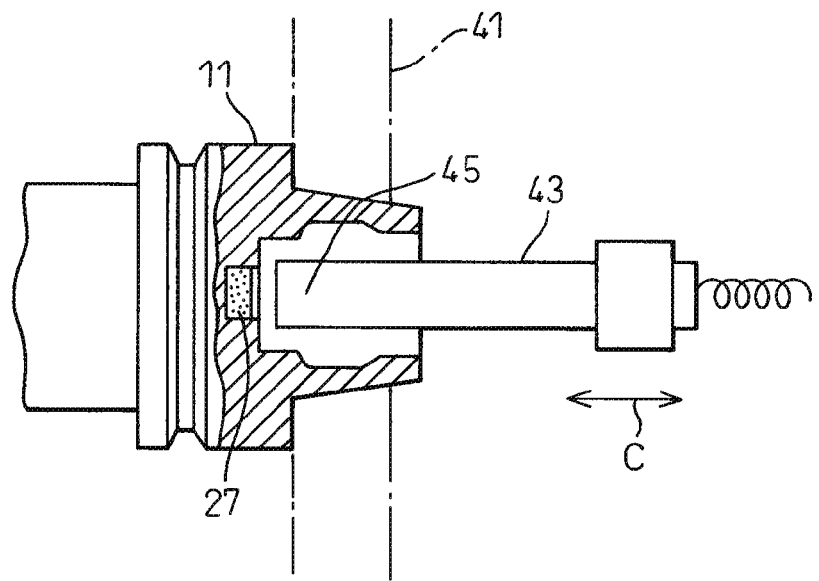
FIG. 2 is a partial cross-sectional view illustrating the state wherein the tool holder of FIG. 1 is equipped with a tool magazine and a reader/writer approaches the ID tag.

FIG. 2 shows the state wherein tool holder 11 having ID tag 27 is equipped with a tool magazine 41. In this state, a reader/writer 43 may be used to read or write data in relation to ID tag 27. Concretely, when a sensor part 45 of reader/writer 43 approaches ID tag 27, the data may be read or saved in a noncontact manner. In addition, reader/writer 43 may be moved in the front-rear direction, as indicated by an arrow C, by means of an actuator (not shown), so as to automatically read or write the data. Otherwise, when another type of reader/writer, capable of reading or writing data without being inserted into hollow portion 17, is used instead, it is not necessary to move such a reader/writer in the front-rear direction as indicated by arrow C.

Since ID tag 27 is positioned at the central part of tool holder 11, it is not necessary to take a rotational angle position of tool holder 11 into consideration, when reading or writing the data in relation to ID tag 27. In other words, in a tool holder of the prior art, wherein an ID tag is embedded in a peripheral part of the tool holder, it is necessary to control or manage a rotational position of the tool holder so that a reader/writer faces the ID tag. On the other hand, in the present invention, it is not necessary to control or manage the rotational position of the tool holder.

In the embodiment, tool holder 11 having ID tag 27, to which the data may be read and written by using reader/writer 43. However, the present invention includes also a tool holder having a read-only ID tag.

Further, ID tag 27 may be positioned in recess 33 so that surface 37 of ID tag 27, facing in the rear direction, protrudes from bottom surface 31. Otherwise, recess 33 may not be formed on bottom surface 31 and ID tag 27 may be directly attached to the central part of bottom surface 31. However in both cases, it is necessary to form a hole on front surface 35 of collet driver 21, the size of the hole being determined so that collet driver 21 does not interfere with ID tag 27.

In addition, the shape of recess 33 formed on bottom surface 31 of hollow portion 17 is not limited to a circle, and may be a rectangular or another shape. Similarly, the shape of ID tag 27 is not limited to a cylindrical or ring shape, and may be a prismatic or another shape.

While the invention has been described with reference to specific embodiments chosen for the purpose of illustration, it should be apparent that numerous modifications could be made thereto, by one skilled in the art, without depending from the basic concept and scope of the invention.

The invention claimed is:

1. A spindle device comprising:
a spindle having a front side and a rear side;
a tool holder having a hollow taper shank with an inner surface, the tool holder rotatably attached to the front side of the spindle;
a split collet inside the spindle; and
a collet driver configured to be moved within the spindle toward a front side and a rear side along a front-rear axis, the collet driver being moved toward the rear side of the spindle to an attachment position so that the split collet is expanded so as to contact an inner surface of a hollow portion of the taper shank when the tool holder is attached to the spindle, and the collet driver being configured to be moved toward the front side of the spindle to a detachment position so that the split collet does not press the inner surface of the hollow portion of the taper shank when the tool holder is detached from the spindle;
wherein the hollow portion of the taper shank has a rearwardly facing bottom surface and is opened at a rear end of the tool holder so that the collet driver contacts the rearwardly facing bottom surface when the collet driver is at the detachment position where the tool holder is detached from the spindle, the rearwardly facing bottom surface having a rearwardly opening recess formed at a center of the rearwardly facing bottom surface; and
wherein an ID tag, adapted to identify a tool and/or the tool holder, is attached in the rearwardly opening recess so that a rearward-most surface of the ID tag, facing toward the rear side of the spindle, is recessed, in the direction of the front-rear axis toward a front side of the tool holder and away from the front side of the spindle, relative to the bottom rearwardly facing surface, and wherein the collet driver and tool holder are configured such that when the collet driver is in the attachment and detachment positions, the collet driver is not capable of contacting the ID tag.

* * * * *